United States Patent [19]

Brown

[11] E Patent Number: Re. 32,213

[45] Reissued Date of Patent: Jul. 22, 1986

[54] EQUIPMENT FOR USE WITH HAND HELD MOTION PICTURE CAMERAS

[76] Inventor: Garrett W. Brown, 1845 Walnut St., Philadelphia, Pa. 19103

[21] Appl. No.: 223,939

[22] Filed: Jan. 9, 1981

Related U.S. Patent Documents

Reissue of:

[64] Patent No.: 4,017,168
Issued: Apr. 12, 1977
Appl. No.: 5,06,,326
Filed: Sep. 16, 1974

[51] Int. Cl.[3] ..... G03B 17/00

[52] U.S. Cl. ..... 352/243; 352/171; 354/74; 354/82; 354/293; 248/123.1; 248/162.1; 248/183

[58] Field of Search ..... 332/243; 354/70, 81, 354/82, 293; 248/18, 123, 179, 183, 280, 281, 284; 224/185; 350/96.24

[56] References Cited

U.S. PATENT DOCUMENTS

| | | | |
|---|---|---|---|
| 218,210 | 8/1879 | Alling et al. | 248/281 |
| 713,177 | 11/1902 | Thomsen . | |
| 817,207 | 4/1906 | Wheeler | 354/82 |
| 991,101 | 5/1911 | Smith . | |
| 1,272,845 | 7/1918 | Peck et al. | 248/280 |
| 1,955,770 | 4/1934 | Richards | 354/70 |
| 1,971,486 | 8/1934 | Jennings . | |
| 2,007,215 | 7/1935 | Remey | 352/243 |
| 2,036,097 | 3/1936 | Pieper . | |
| 2,090,439 | 8/1937 | Carwardine | 248/123 |
| 2,239,201 | 4/1941 | Pyzel . | |
| 2,287,577 | 6/1942 | Stava . | |
| 2,447,667 | 8/1948 | Raby . | |
| 2,506,228 | 5/1950 | Lofstrand | 248/123 |
| 2,552,205 | 5/1951 | Moss . | |
| 2,636,822 | 4/1953 | Anderson . | |
| 2,698,356 | 12/1954 | Roos . | |
| 2,700,524 | 1/1955 | Lauterbach | 240/280 |
| 2,746,369 | 5/1956 | Beard | 354/82 |
| 2,787,434 | 4/1957 | Jacobsen | 248/280 |
| 2,806,416 | 9/1957 | Jones . | |
| 2,833,504 | 5/1958 | Sacksteder | 248/280 |
| 2,873,645 | 2/1959 | Horton | 354/82 X |
| 2,901,202 | 8/1959 | Stava | 403/199 |
| 2,911,525 | 11/1959 | Strom | 240/41.15 |
| 2,919,876 | 1/1960 | Plain . | |
| 2,941,776 | 6/1960 | Lauterbach . | |
| 2,945,428 | 7/1960 | Dearborn . | |
| 2,962,251 | 11/1960 | Karpf | 352/243 |
| 2,997,242 | 8/1961 | Grosholz . | |
| 3,044,346 | 7/1962 | Fieux . | |
| 3,103,257 | 9/1963 | Richards . | |
| 3,143,326 | 8/1964 | Hamilton | 352/243 |
| 3,226,073 | 12/1965 | Jacobsen | 248/280 |
| 3,252,542 | 5/1966 | Thornton-Trump | 182/2 |
| 3,273,484 | 9/1966 | Lapsley . | |

(List continued on next page.)

FOREIGN PATENT DOCUMENTS

| | | | |
|---|---|---|---|
| 137519 | 5/1902 | Austria | 354/105 |
| 441148 | 2/1927 | Fed. Rep. of Germany . | |
| 1203250 | 8/1970 | United Kingdom . | |

OTHER PUBLICATIONS

American Cinematographer, Sep., 1973, pp. 1156–1157.
Fleximount Publication supplied by applicant.
American Cinematographer, Dec., 1976, pp. 1336, 1337, 1377.

*Primary Examiner*—Monore H. Hayes
*Attorney, Agent, or Firm*—Weiser & Stapler

[57] ABSTRACT

Equipment for use with hand-held motion picture and video cameras comprises a pair of interconnected spring loaded arms, one end of which is pivotally supported by a carrying brace worn by a cameraman and the other end of which is connected to a handle positioned to mount the camera equipment at approximately the center of the moment of inertia. The camera and its associated equipment are mounted in exploded, balanced relation about the handle. The weight of the camera equipment is substantially counterbalanced by the action of the spring loaded arms without employing counterweights. A camera viewer is provided, to facilitate viewing from a position remote from the camera itself and not necessarily governed by the camera orientation.

71 Claims, 7 Drawing Figures

U.S. PATENT DOCUMENTS

| | | | |
|---|---|---|---|
| 3,332,593 | 7/1967 | Fauser | 354/82 |
| 3,352,521 | 11/1967 | Tyler . | |
| 3,396,931 | 8/1968 | Eckstein . | |
| 3,417,953 | 12/1968 | Hillquist | 248/280 |
| 3,426,190 | 2/1969 | Bobrick | 240/73 |
| 3,437,748 | 4/1969 | Latady et al. . | |
| 3,467,350 | 9/1969 | Tyler . | |
| 3,490,833 | 1/1970 | Gottschalk | 352/243 |
| 3,495,517 | 2/1970 | Sweet | 350/96.24 |
| 3,498,577 | 3/1970 | Mehr | 248/280 |
| 3,528,734 | 9/1970 | Bruel | 352/129 X |
| 3,543,019 | 11/1970 | Jacobsen | 240/81 |
| 3,604,660 | 9/1971 | Marley | 354/70 |
| 3,643,345 | 2/1972 | Wilton . | |
| 3,669,553 | 6/1972 | Harvey | 350/96.24 |
| 3,756,549 | 9/1973 | Lange | 243/123 |
| 3,767,095 | 10/1973 | Jones . | |
| 3,774,873 | 11/1973 | Krogsrud | 248/280 |
| 3,776,494 | 12/1973 | Baucheron | 248/18 |
| 3,789,213 | 1/1974 | Sonneman . | |
| 3,790,773 | 2/1974 | Sapper . | |
| 3,900,140 | 8/1975 | Kelso et al. . | |

EQUIPMENT FOR USE WITH HAND HELD MOTION PICTURE CAMERAS

Matter enclosed in heavy brackets [ ] appears in the original patent but forms no part of this reissue specification; matter printed in italics indicates the additions made by reissue.

BACKGROUND OF THE INVENTION

This invention relates generally to the field of photographic equipment, and more particularly, pertains to portable equipment suitable for use in hand-held motion picture photography.

In taking photographs with a strip film fed motion picture camera or when employing a video tape type of camera, it is extremely important that the camera be maintained in as stable a position as possible in order to obtain high quality results. Such stability commonly has been achieved by mounting the camera on a tripod or otherwise supporting the camera, either video tape or motion picture type, on a stationary support so as to eliminate any possibility of the undesirable camera motion. Problems generally arise when it is desired to take motion pictures under conditions wherein it is necessary or desirable that the camera itself be mobile or be moved during the photographic process. In such procedures, it has been the usual prior art practice generally to mount the camera on a wheeled dolly, sometimes running on temporary tracks or on a constructed platform extending along the intended path of movement, thereby permitting the camera equipment to be moved along a smooth path. When it has been necessary or desirable to employ a hand-held camera, high quality results have generally been unobtainable when the cameraman walks or runs with the camera because of the attendant increase in instability, particularly the quick angular deviations along the axes of pan, tilt and roll, which cannot be adequately controlled. Such instability has heretofore been characteristic of hand-held motion picture photography.

In order to overcome the problems encountered in hand-held cimematography and to reduce the great expense normally encountered in constructing temporary tracks or temporary platforms, prior workers in the art have attempted to develop portable camera stabilizing devices. One such device has been disclosed in U.S. Pat. No. 2,945,428. It was found that the camera had little or no mobility relative to the cameraman and that such devices required that the cameraman have his eye directly adjacent to the camera to properly direct the camera lens toward the object. These factors tend to limit the versatility of camera angles of types and shots which can be made with such devices. Other prior workers in the art have attempted to solve the problem by employing gyro stabilizers and lens constructions which adjust the light paths entering the camera in order to produce a stabilized image. These devices also require that the camera be mounted in a relatively fixed positionposition with respect to the cameraman. The prior art devices tend to restrict the speed of panning and tilting that can be achieved and are further deficient in that they introduce other arbitrary motions of their own if their inherent limits are exceeded by walking or running. Further, the prior art devices insofar as is known without exception, are of little benefit in the stabilization of "roll" or motion about the axis passing through the camera's lens. All of the prior art stabilizing devices of which I am familiar require the addition of considerable weight beyond that of the camera itself thereby introducing a factor directly relating to the strength of the cameraman himself. The foregoing factors tend to limit the versatility of prior art devices by limiting the camera angles and the types of shots which can be achieved by utilizing such equipment.

None of the prior art devices has been completely successful because of the lack of one or more of the requirements met by the present invention, namely:

1. remote viewfinding, that is, isolating the camera from the motions of the cameraman's head;
2. inherent stability, that is, the tendency to resist the rapid angular motions around all three possible axes that plague hand-held shooting, and slow them down to the point that the human body can effectively deal with without introducing new ones;
3. perfect floatation and isolation, that is, relieving the cameraman of the necessity to exert force to support the camera, thus preserving the delicacy of touch required for fine control of the camera's motions; and
4. minimum increased weight, that is, eliminating the need for balancing counterweights, particularly in the case of the heavier 35 mm motion picture cameras and video cameras.

SUMMARY OF THE INVENTION

In accordance with the present invention, the equipment for enabling a mobile photographer to take high quality, ambulatory hand-held photographs with a strip film fed or video camera includes an expanded camera which has the mass of the camera distributed at points remote from each other about a handle in a manner so that the handle is located at approximately the center of the moment of inertia of the system. Employing the expanded camera of the present invention increases inherent stability of the system in a manner that permits high quality results when utilizing hand-held equipment. The spring loaded support arms permit the expanded camera to essentially float freely in a manner to isolate the camera from any movements of the cameraman. It will be noted that the equipment of the present invention functions to improve quality of results without adding significantly to the overall weight of the mobile equipment. The camera viewer is provided with a remote view finding device, such as a flexible fiber coherent optic bundle extending between the reflex view finding system of the camera body and the cameraman's eye or a video monitor affixed to the camera. This liberates the cameraman from the necessity of placing his eye directly adjacent to the camera view finding system in order to properly aim and focus the camera. As herein employed, the word "handle" means a structure which is functioned by the cameraman to orient and move the point of control of the camera.

As hereinafter and hereinbefore employed, the term "camera" is defined as any motion picture device such as a strip film fed camera, a video camera or other device whose stability is essential even when carried by an ambulatory operator. The term "dynamic" as herein employed means mobile or being connected to a mobile apparatus. The apparatus of the present invention may also be employed to support other mobile pieces of equipment wherein stability is essential and wherein substantial isolation from the operator may be desirable, for example, when operating certain types of hand held military weapons, lasers, etc.

Camera supporting means are provided which are capable of being carried by an ambulatory cameraman to support, to a great extent, the vertical weight of the camera so that the cameraman may use his hands almost entirely to manipulate the camera to the desired camera angle and to function the camera controls. Camera suporting means tend to isolate and float the camera in a manner substantially independent of the movement of the cameraman himself. In this manner, the cameraman may use his hands solely to manipulate the camera to the desired camera angle and to make necessary adjustments to the camera such as focus, zoom and aperture. In practicing the present invention, the camera equipment is subdivided into three or more sub-assemblies which are remotely located from each other and which are constructed and arranged about a handle in a balanced arrangement. Preferably, the handle is located near or close to the center of the moment of inertia of the mass of the camera. The camera handle is mounted upon a gimbal yoke which in turn is supported by a pair of longitudinally juxtaposed, spring loaded interacting parallelogram, support arms. One end of the support arms is affixed to the support harness in a pivotal connection and the harness is worn by the cameraman in a manner to carry the camera weight without using his hands or arms. The other end of the support arms carries the gimbal yoke in a pivotal manner to permit relatively free floating of the camera and accessory equipment.

The reason for subdividing the camera into several parts and then expanding these parts or locating them remote from each other and arranged about the handle is to balance the system and to make the camera far more resistant to the effects of rapid, jerky angular movement which may be occasioned by movement of the cameraman or of the camera. Inasmuch as a moment of inertia is proportional to both mass and the distance between the center of the moment of inertia and the mass, the remote positioning of the camera and its components parts increases the moment of inertia and thereby renders the camera less prone to rapid movement. The spring loaded support arms and the pivotal connections permit free floating of the camera and act to isolate the camera itself from the movements of the cameraman thereby preventing unwanted movement of the camera occasioned by the motion of the cameraman himself. In hand-held photography, it is desirable to minimize the load borne by the cameraman. The expansion of the elements of a motion picture or a video camera to distances remote from each other balances the weight, increases the moment of inertia of the system and decreases the tendency to introduce unwanted motion at the image, all without substantially increasing the weight of the camera equipment.

It is therefore an object of the present invention to provide an improved apparatus for hand held photography.

It is another object of the present invention to provide superior equipment for taking photographs with a strip film fed camera by an ambulatory cameraman.

It is another object of the present invention to provide an expanded, motion picture or video camera having a handle about which the camera components are so arranged that the handle is located approximately at the center of the moment of inertia of the system.

It is another object of the present invention to provide the strip film fed camera equipped with a novel remote view finding device.

It is another object of the present invention to provide camera spring loaded supporting means capable of attachment to a cameraman for supporting a hand held camera.

It is another object of the present invention to provide a novel equipment for use in hand held photography which includes a carrying strap worn by a cameraman, a pair of longitudinally juxtaposed, spring loaded support arms pivotally affixed at one end thereof to the carrying strap, a gimbal yoke pivotally carried by the other end of the support arms, the gimbal yoke supporting a balanced expanded camera system thereon.

It is another object of the present invention to provide novel equipment for hand held photography that is rugged in construction, inexpensive in manufacture and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

DESCRIPTION OF THE PREFERRED EMBODIMENT OF THE INVENTION

Figure 1:
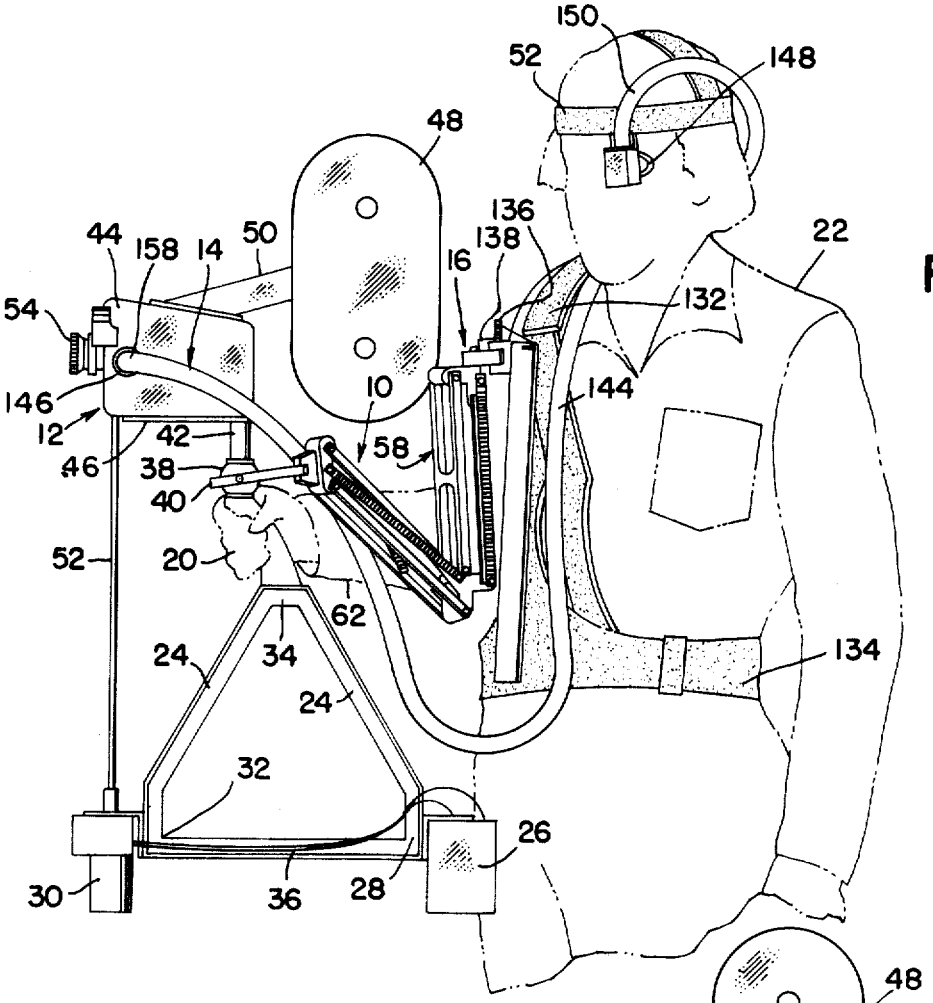
FIG. 1 is a perspective view showing the equipment of the present invention in use.

Although specific terms are used in the following description for the sake of clarity, these terms are intended to refer only to the particular structure of my invention selected for illustration in the drawings and are not intended to define or limit the scope of the invention.

Figures 2, 5, 6, 8:
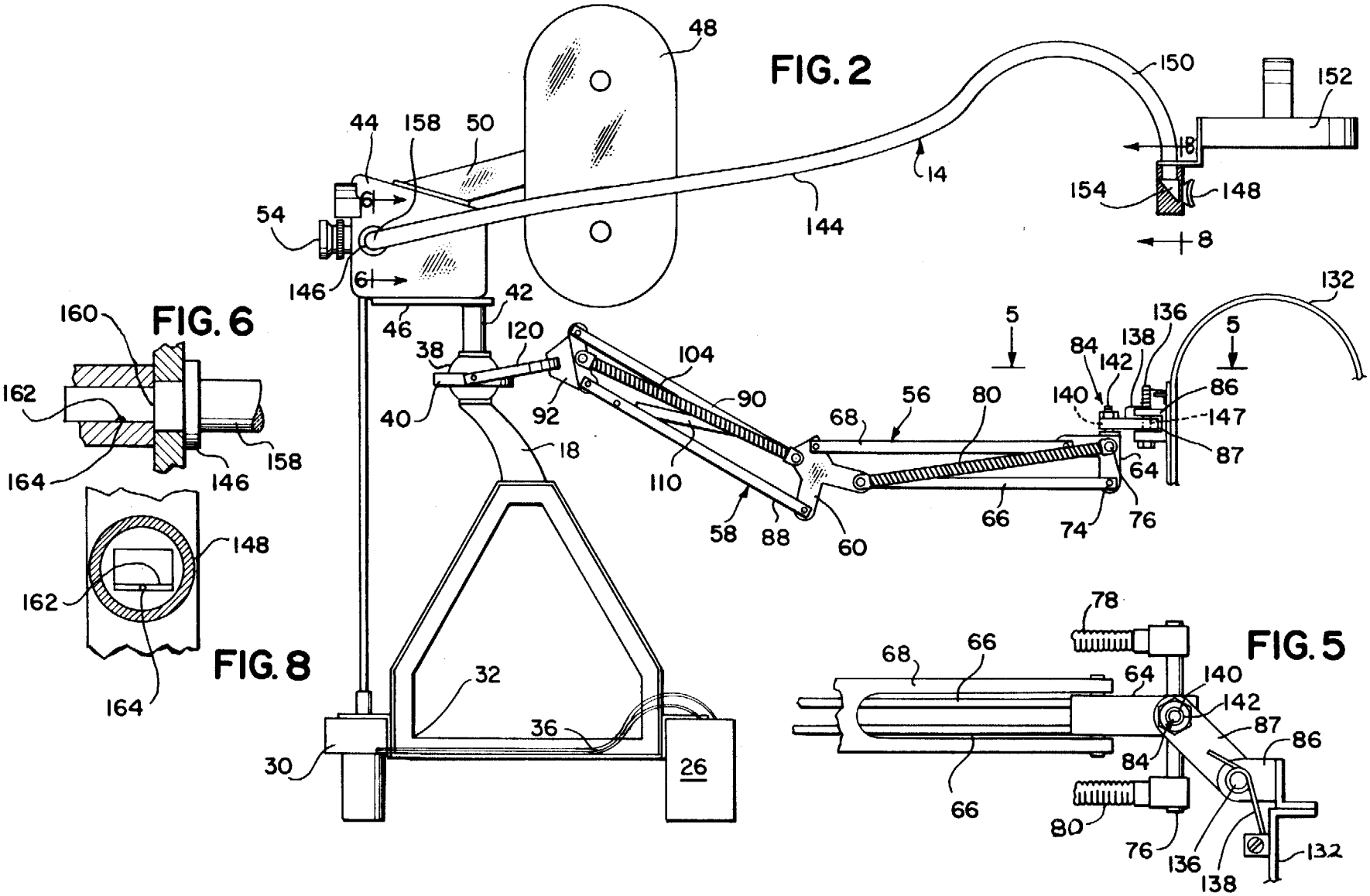
FIG. 2 is an enlarged, side elevational view of the equipment.
FIG. 5 is an enlarged, cross sectional view taken along Line 5—5 of FIG. 2, looking in the direction of the arrows.
FIG. 6 is a cross sectional view taken along Line 6—6 of FIG. 2, looking in the direction of the arrows.
FIG. 8 is a sectional view taken along Line 8—8 of FIG. 2.

Referring now to the drawings, I show in FIGS. 1 and 2 equipment for use in hand held photography, generally designated 10 which comprises three primary elements, namely, an expanded camera 12, a remote view finding system 14 and the camera supporting means 16. It will be appreciated that the arrangement of parts set forth is illustrative only and shows one method of expanding the camera components. Other configurations may be employed in accordance with the actual equipment utilized and still fall within the scope and intent of this invention.

The expanded camera 12 is sub-divided into a plurality of sub-assemblies which are located remote from each other and which are constructed and arranged about a handle 18 so that the handle 18 is located at or close to the moment of inertia of the mass of the expanded camera. As shown in FIG. 1, the handle preferably is shaped so as to be readily grasped by one hand 20 of the cameraman 22. The mass of the camera is illustrated as being expanded into three components, which are integrally and securely fastened together to form a balanced, operative camera system. It will be noted that the balance is achieved by expanding portions of the camera 12 itself and not by employing counterweights of other balancing materials which would have the effect of adding weight without additional function to the system. Although the camera equipment is shown as expanded into four basic components, it will be appreciated that it is not the number of components employed that is significant, but rather, the concept of expanding the camera elements so as to achieve balance without adding significant weight. Accordingly, the use of more or fewer expanded components is considered well within the scope and intent of this specification.

Still referring to FIGS. 1 and 2, it will be observed that the handle 18 is affixed to a substantially two-dimensional frame 24 which may be generally triangular or of other shape to mount the camera components in an expanded manner for balance purposes. While the frame 24 is illustrated in generally triangular configuration, it will be understood that the invention is not limited to any particular shape of frame. It being understood that the purpose and function of the frame 24 is to expand and space the various portions of the expanded camera 12 to provide a system that is substantially balanced throughout with the handle 18 positioned approximately at the center of the moment of inertia of the expanded camera 12. For purposes of illustration, the camera battery 26 is illustrated as secured in fixed position near one corner 28 of the frame 24. Similarly, the camera motor 30 is affixed near another corner 32 of the frame 24 and the handle 18 is affixed to a third corner 34 of the frame 24 in a manner to provide a unique expanded, and balanced arrangement for camera equipment. Suitable wires 36 interconnect the battery 26 and the motor 30 in conventional manner. The wires 36 may be affixed to interior portions of the frame 24 or may be run in tubing or otherwise protected in well known manner to prevent damage during all periods of storage and use.

The handle 18 terminates upwardly in a bearing mounted socket 38 which is configured to receive the camera mounting strut 42 and is affixed thereto. The socket 38 is carried upon the gimbal ring 40 and receives therein the camera mounting strut 42 in a connection to permit the camera body 44 to be easily affixed to and removed from the socket 38. The socket bearing permits free rotary movement of the expanded camera 12 relative to the handle 18. The camera body 44 is affixed to a mounting platform 46 in a manner to cantilever forwardly of the mounting strut 42 for purposes of balancing the expanded camera system 12. In further interest of balancing the system, the usual film magazine 48 is expanded rearwardly and may be extended from the camera body 44 by the magazine throat 50. Optimumly, the geometry of the system is such that the expanded mounting of the camera battery 26, the camera motor 30, the camera body 44 and the film magazine 48 are so positioned relative to the frame 24 and are so balanced that the handle 18 is positioned at substantially the center of the moment of inertia of the expanded camera system 12. A drive shaft 52 interconnects the camera motor 30 with the camera body 44 to function the camera in conventional manner.

There are, of course, an infinite number of arrangement which could be used for distributing the weight of the expanded camera system 12. When the camera is to be used by a mobile cameraman for taking hand held pictures, it is preferable that the elements of the camera be arranged in rectangular fashion as illustrated, and it is further preferable that all of the parts be positioned generally in the same vertical plane. As shown in FIG. 2, the camera body 44 and the film magazine 48 mount above the handle 18 and the camera motor 30 and the camera battery 24 mounts below the handle 18. The reason for this preference is that the orientation of the elements in this fashion gives the expanded camera 12 the highest moment of inertia in "roll", that is the tendency of the camera to tip sideways around the horizontal axis passing through the camera parallel to the direction from which light enters the camera lens 54. In most cases, it is more difficult for an ambulatory cameraman to control rolling than it is to control "panning", that is rotation about a vertical axis passing through the camera and "tilting," that is rotation about a horizontal axis which is perpendicular to the direction in which light enters the camera lens.

Figure 4:
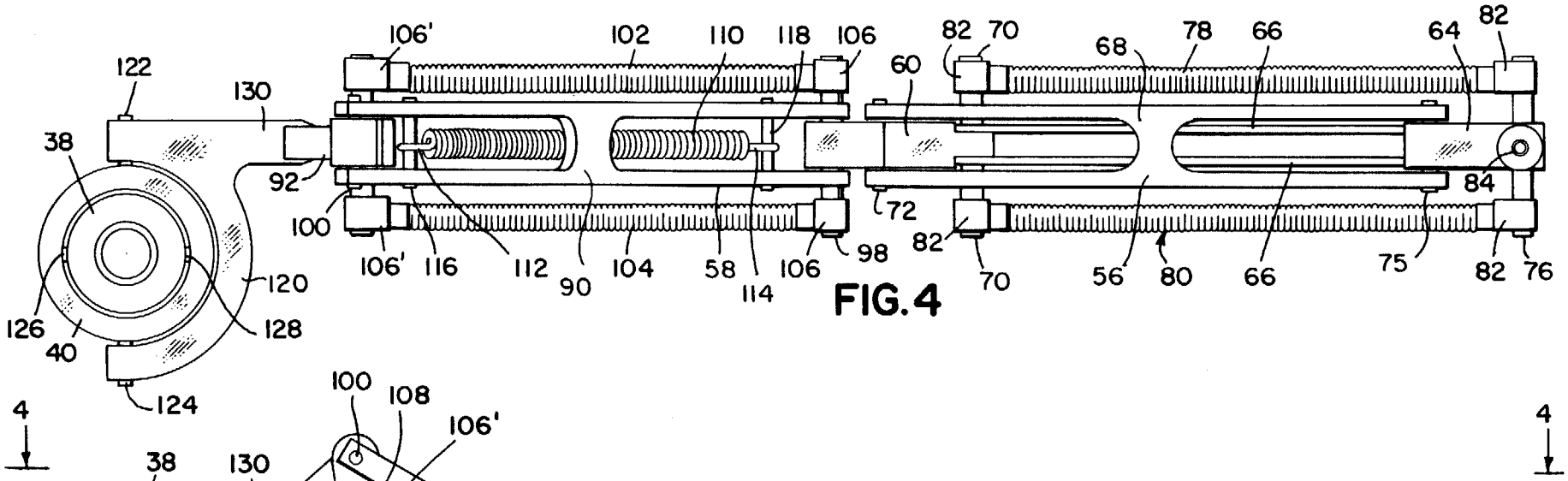
FIG. 4 is a top plan view of the spring arms and yoke as seen from Line 4—4 of FIG. 3, looking in the direction of the arrows.
Figure 3:
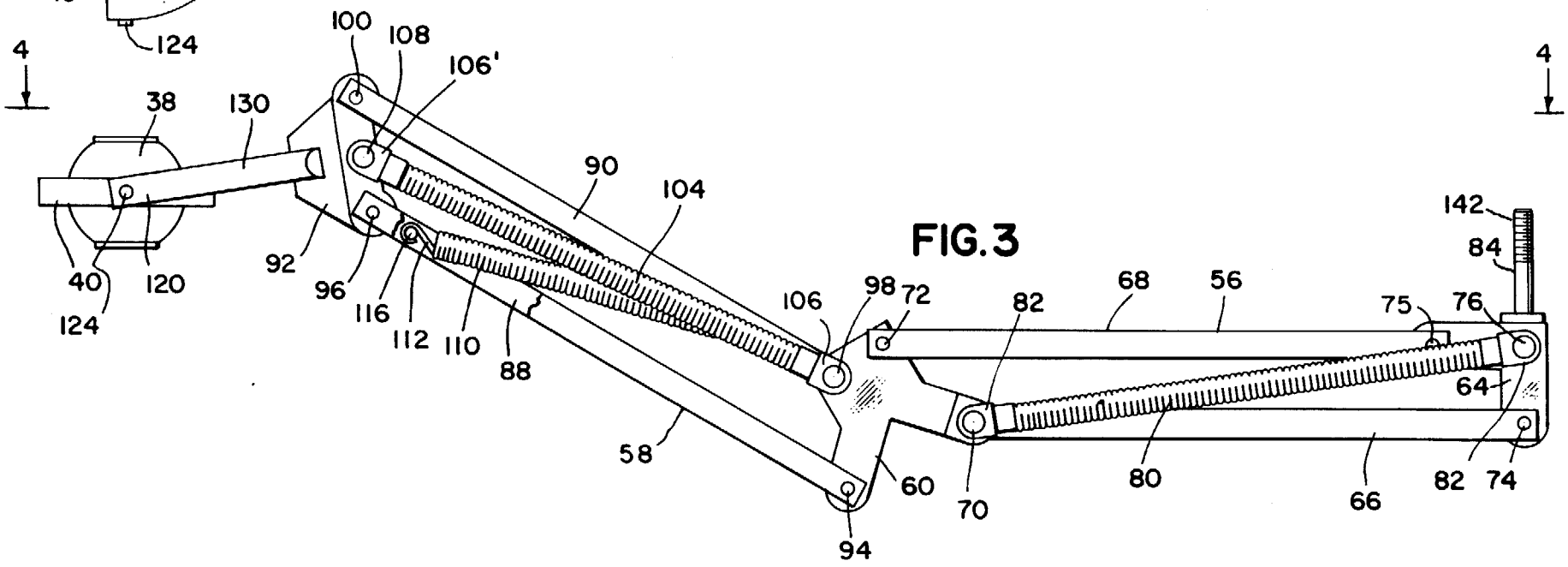
FIG. 3 is an enlarged, side elevational view of the spring loaded support arms and yoke.

Referring now to FIGS. 2, 3 and 4, one design of camera supporting means is illustrated in detail and comprises essentially a pair of longitudinally juxtaposed support arms 56, 58 which are pivotally interconnected at the medial block 60. The support arms 56, 58 closely approximate the size of the cameraman's arm and are so arranged and so pivoted as to closely duplicate all movements of the cameraman's arms 62. The camera supporting means may be considered as an exo-skeleton so designed as to be able to closely follow the arm movement of the cameraman. The support arm 56 closest to the cameraman 22 extends between the medial block 60 and the harness mounting block 64. A double bifurcated upper link 68 pivotally interconnects between the medial block 60 and the harness mounting block 64. Similarly, a double bifurcated lower link 66 pivotally interconnects between the medial block 60 and the harness mounting block 64 below the upper link connections. An upper medial pivot pin 72 and a lower medial pivot pin 70 respectively pivotally interconnect one end of the upper link 68 and one end of the lower link 66 with the medial block 60. An upper pivot pin 75 interconnects the other end of the upper link 68 with the harness mounting block 64 and a lower pivot pin 74 pivotally interconnects the other end of the lower link 66 with the harness mounting block 64. In this manner, the medial block 60 may be readily moved in an arc around the harness mounting block 64. It will be noted that the upper link 68, the lower link 66, the harness mounting block 64 and the medial block 60 form a parallelogram configuration which is fully pivoted about the upper pivot pins 72, 75 and the lower pivot pins 70, 74.

A pair of balancing springs 78, 80 of the coil spring type terminate laterally in mounting connectors 82 and are preloaded to extend angularly between the upper pivot pin 76 at the right end and the lower medial pivot pin 70 at the left end.

It will be noted that the springs 78, 80 angularly cross the parallelogram formed by the upper and lower links 68, 66 and the end blocks 64, 60. The bias of the springs 78, 80 continuously act to collapse the support arm 56 parallelogram. The action of the balancing springs 78, 80 tends to raise the medial block 60 as the parallelogram is closed by drawing the upper and lower links 68, 66 together. The bias of the springs 78, 80 is essentially balanced by the weight of the expanded camera 12 in a manner to permit the expanded camera 12 to essentially "float" irrespective of any movement of the cameraman 22. The harness mounting block 64 is equipped with an upwardly projecting threaded mounting stud 84 which is received in the harness mounting bracket 86 bearing in a secure manner as hereinafter more fully set forth. The medial block 60 does not pivot as the arms 56, 58 are pivoted, but rather, retains its angular orientation in a radial arc as the parallelogram 12 opened and closed.

The forward support 58 includes a double bifurcated, upper link 90 and a double bifurcated lower link 88 which is arranged parallel to and below the upper link 90. The upper link extends forwardly from the medial block 60 and pivotally connects to the forward block 92. The upper link 90 is respectively pivotally connected to the medial and forward blocks 60, 92 at the pivot pins 98, 100. The lower link 88 extends between the medial block 60 and the forward block 92 and is pivotally interconnected therewith at the respective pivot pins 94, 96. The upper and lower links 90, 88, the medial block 60 and the forward block 92 form a parallelogram configuration, said parallelogram being pivotally arranged about the respective pivot pins 96, 100 at the front and 94, 98 at the rear. A pair of balancing springs 102, 104 extend between the medial block 60 and the forward block 92 for further load balancing purposes. The springs 102, 104 angularly cross the parallelogram configuration and the spring bias tends to collapse the parallelogram. The springs terminate endwardly in rearward and forward mounting connectors 106 and 106'. The rearward mounting connector 106 pivotally connects to the upper medial block pivot pin 98 and forwardly connects to the forward block 92 at the pivot pin 108, which pivot pin is positioned intermediate the upper and lower pivot pins 96, 100. The springs 102, 104 are preloaded and function to tend to close the forward support arm 58 parallelogram by pulling the upper and lower links 90, 88 together. This action tends to counteract the forces imposed on the forward block 92 by the weight of the expanded camera 12 which would have the effect of urging the block 92 downwardly. An intermediate spring 110 extends in a vertical plane that is generally parallel to and intermediate the balancing springs 102, 104 and has its forward and rearward ends 112, 114 respectively interconnected between the forward pin 116 and a rearward pin 118. The pins 116, 118 respectively laterally interconnect rear bifurcated legs of the upper link 90 and the leg of the forward bifurcated end of the lower link 88. In practice, it is desirable to fabricate the forward support arm springs 102, 104 of greater strength than the rear support arm springs 78, 80. In this manner, the forward springs 102, 104 act to stiffen the rear links 66, 68 by imposing increased forces on the rear springs 78, 80.

The forward block 92 forwardly carries a transversely offset gimbal ring 40 which is laterally pivotally connected to the attaching yoke 120 by the right and left yoke pivots pins 122, 124. The gimbal ring 40 connects to the socket bearing 38 at the longitudinally offset gimbal pivot pins 126, 128 to thereby impart full pivotal motion in two directions to the socket bearing 38. The socket bearing 38 permits full rotary movement of the mounting strut 42 thereby imparting great freedom to the camera mounting arrangement. The yoke 120 is integrally affixed to the forward end of a link 130 in a laterally offset position for clearance purposes and the link 130 in turn is carried upon the forward block 92 in a stationary connection. In this manner, the weight of the expanded camera 12 when applied at the socket bering 38 tends to pull the forward block 92 in a downward direction. Such downward movement of the forward block 92 would tend to open the parallelogram including the links 88, 90, which forces would be counterbalanced by the action of the springs 102, 104, 110. Thus, when the expanded camera 12 is seated within the socket bearing 38, both the forward block 92 and the medial block 60 have a tendency to rotate in a direction to close the forward support arm parallelogram and to force the forward block 92 downwardly. As hereinbefore set forth, the respective springs 102, 104, 110 are all preloaded and positioned to tend to collapse the forward support arm parallelogram. By judiciously choosing and preloading the balancing springs to counterbalance the weight of the expanded camera 12, the camera weight can be substantially counterbalanced in a vertical direction without the need of additional weights such as in the form of conventional counterweights. The construction imposes no lateral resistance to movement. The spring and support arm arrangement of the present invention essentially allows the expanded camera 12 to float in space in any of a wide range of positions wherever aimed by the cameraman. Any movement of the cameraman 22 himself will be compensated by the support arms 56, 58 so that the camera 12 is substantially isolated from activity such as walking or running on the part of the cameraman. The inertia of the camera system is much greater than the links' preference for any given position and therefore, interaction with the cameraman's hand provides high quality results.

Referring again to FIGS. 1 and 2, I show a brace or carrying strip 132 which is so sized and constructed as to rest upon the shoulder of the cameraman for support of all of the equipment 10. A suitable belt 134 is provided to permit the brace to be comfortably worn by the cameraman 22 and to be easily adjusted to the cameraman's body. The harness mounting bracket 86 is suitably affixed to the carrying strap 132. A connecting plate 87 is in horizontal, pivotal relation to the bracket 86 about the vertical pivot pin 136. A spring 138 is positioned about the pivot pin 136 and biases between the connecting plate 87 and the harness mounting bracket 86 in a manner to continuously urge the connecting plate 87 in a clockwise direction (when looking from above) about the vertical pivot pin 136. The connecting plate 87 is endwardly provided with a vertical opening 140 of size to receive the mounting stud 84 of the support arm 56 therein. The stud 84 may be secured to the connecting plate 87 in well known manner such as by threadedly engaging a nut (FIG. 2) on the threaded portion 142. In this manner, it will be noted that the support arms 56, 58 are provided with horizontal pivotal movement about the harness mounting bracket 86 at the engagement of the mounting stud 84 within the bracket opening 140. Further, the mounting connecting plate or link 87 itself has pivotal horizontal movement relative to the brace 132 about the spring loaded pivot pin 136. In this manner, any horizontal movement at the shoulder of the cameraman 22 can be closely approximated and duplicated by the support arms 56, 58 at the pivotal connections about the pivot pin 136 and the mounting stud 84. Additionally, the arms 56, 58 are vertically movable relative to the brace 132 about the respective pivot pins 74, 76, 70, 72, 94, 98, 96 and 100. The weight of the expanded camera 12 is carried only by the tendency of the support arms to rise as the springs 78, 80, 102, 104, 110 continuously bias the parallelogram of the support arms 56, 58 to a collapsed position. Thus, the cameraman 22 has free mobility relative to the expanded camera 12 in that all movements through his shoulder and arms are closely duplicated and compensated for in the bracket 86 connecting plate 87 and in the support arms 56, 58. The combination of the harness mounting bracket 86, the spring loaded support arms 56, 58 and the offset gimbal mounting of the socket bearing 38 all combine to assure that the angular orientation of the expanded camera 12 is not dependent upon or altered by changes in the position of the cameraman. Thus, should a cameraman 22 be running, walking, alternately stooping and standing, or the like, the effect of such movement on the orientation of the expanded camera 12 will be minimized. The function of the carrying brace 132 and the belt 134 is to sustain at least part, and desirably most or all of the vertical load of the camera 12, thereby leaving the cameraman free to manipulate the camera with this outstretched hands.

Figure 7:
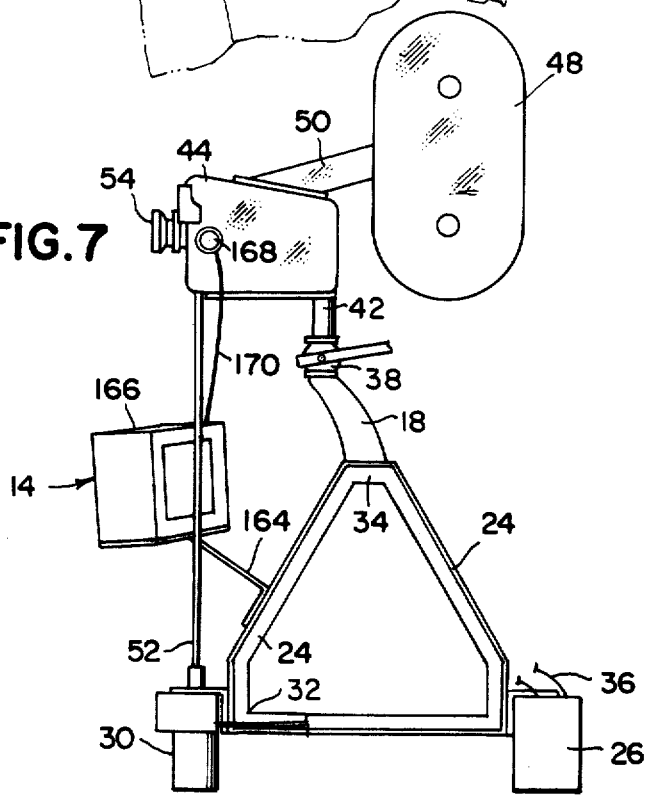
FIG. 7 is a schematic elevational view of a modification of the invention wherein video view finding equipment is employed.

As best seen in FIGS. 1 and 7, the expanded camera 12 is provided with a remote view finding system generally designated 14. The remote view finding device enables a moving or stationary cameraman to take shots from a wide variety of angles and height which would not be possible if the cameraman had to keep his eye adjacent to the camera view finder. Thus, the equipment of the invention may be used to photograph events transpiring to the side or to the rear of the cameraman while the cameraman 22 is standing still, running, walking, riding in a vehicle, facing in another direction, or the like. In the embodiment illustrated, the remote view finding system 14 includes generally a video monitor 166 (FIG. 7) or a flexible fiber optic bundle 144 which is flexible throughout its length from its connection to the camera body viewer 146 to the eye piece 148. The fiber optic bundle 144 is characterized by its ability to transmit light throughout the length of the bundle, regardless of its configuration. The fiber optic bundle 144 consists of a large number of closely associated, small diameter, light transmitting fibers which are secured together into a bundle in the manner well known to those skilled in the art of fiber optics. The fiber optic bundle 144 has a cross section equal to the size of a frame of the film being fed through the camera body 44. For example, with reference to FIG. 2, if the camera body 12 is employed for use with 16 mm motion picture film, the cross sectional size of the fiber optic bundle 144 will be the same as a frame of the 16 mm film. In the case of 35 mm cameras, I prefer to employ a 35 mm to 16 mm reduction bundle near the film gate to thereby permit use of the same 16 mm fiber optic bundle 144. One end of the fiber optic bundle 144 is secured to the camera body 44 at the camera body viewer 146 by means of suitable, conventional means, such as threaded connectors. The camera body 44 includes a mirror shutter (not shown) for deflecting the image that impinges on the lens of the camera into the camera end of the fiber optic bundle 144. Preferably, the camera end of the fiber optic bundle 144 is placed perpendicular to and immediately adjacent the film gate in the position normally occupied by the ground glass portion of the usual camera view finder.

The fiber optic bundle 144 is sufficiently long to traverse a comfortable distance between the camera body 44 and the eye of the cameraman 22 who is manipulating the expanded camera 12. A distance of 6 feet is normally sufficient for this purposes. The end 150 of the fiber optic bundle connects into a prism 154 which communicates with the eye piece 148 in a manner to permit the image carried by the fiber optic bundle 144 to be readily viewed by the cameraman through the eye piece 148. The head brace 152 may be fabricated of webbing or other suitable material to permit easy adjustment as to head size. The prism 154 and the eye piece 148 are supported by the head brace 152 in conventional manner to permit the eye piece to be carried over the eye of the cameraman for viewing purposes.

The remote view finding device preferably includes means for indicating the angular orientation of the camera lens 54 through the remote view finding device 14. As seen in FIGS. 6 and 8, the preferred means for indicating the angular orientation of the camera lens about the roll axis comprises a level indicating device 162, such as a floating bubble of the type generally used in a carpenter's level illuminated by a light emitting diode or other means and sealed to prevent light impingement upon the film, positioned at the camera body end 158 of the fiber optic bundle 144, so as to appear at the top of the image seen by the cameraman at the remote end 150 of the fiber optic bundle 144. The level indicating means preferably is graduated to show the angular deviation around the roll axis.

The combined effect of the expanded camera 12, the remote finding device 14 and the camera supporting means 16 is to provide equipment by which an ambulatory cameraman 22 may take motion pictures, videotapes and the like while running, skiing, riding in vehicles, etc., which are free of sharp, jerky movements and functionally indistinguishable from the "dolly shots." The equipment of the present invention eliminates the necessity of setting a mobile camera on a dolly and then laying tracks or constructing a platform upon which the dolly may be moved. The expanded camera 12 has a high moment of inertia which tends to resist rapid angular movement when subjected to sudden shocks. The camera supporting means relieve the cameraman of the burden of supporting the camera's weight with his hands so that his hands are free to manipulate the camera and its controls. The camera supporting means, by relieving the vertical load on the cameraman's hands also enables the cameraman's hands to absorb shocks more effectively. The remote view finder device enables the cameraman to take shots from a wide variety of angles which would not be possible if the cameraman had to keep his eye immediately adjacent to the camera view finder 146. Thus, the equipment of the invention may be used to photograph events transpiring to the side of or even to the rear of the cameraman, while the cameraman is standing still, running, walking, skiing, riding in a vehicle, or the like.

Referring now to FIGS. 6 and 8, I show camera end 158 of the fiber optic bundle 144 as it enters the camera viewer 146. The bundle 144 terminates interiorly at the point occupied normally by the ground glass 160 of the camera optic system. In the embodiment illustrated, the camera is suitable for 35 mm film and the fiber optic bundle is fabricated of 16 mm diameter, the maximum practical size. An intermediate reduction bundle can be utilized consisting of tapered fibers is employed to reduce the image of a 35 mm camera to 16 mm. In this manner, the smaller end of the tapered bundle can then directly contact the end 158 of the 16 mm film optic bundle 144, either for use with 16 mm or 35 mm cameras. A level indicating device 162 of the type having a movable bubble 164 positioned along one horizontal side of the camera optic system in a position wherein it can be simultaneously viewed through the eye piece 148 and through the fiber optic bundle 144, together with the image. Thus, the angular orientation of the camera body 44 can be easily monitored by the cameraman 22 when he uses the equipment 10 during the picture taking process.

As illustrated in FIG. 7, the remote view finding apparatus of the present invention is equally applicable to video equipment wherein a conventional monitor 166 can be remotely mounted from the camera 44 by employing a rigid strut 164. A conventional electronic vidicon tube feeds the camera image to the monitor 166 in well known manner through the interconnecting wires 170.

Although I have described the present invention with reference to the particular embodiments of the invention herein set forth, it is understood that the present disclosure has been made only by way of example and that numerous changes in the details of construction may be resorted to without departing from the spirit and scope of the invention. Thus, the scope of the invention should not be limited to the foregoing specification, but rather only the scope of the claims appended hereto.

I claim:

1. A portable camera equipment system especially adapted for operation by a cameraman in motion and capable of being hand-guided, the system being of improved stability against angular deviations in pan, tilt and roll, and substantially free-floating in a manner to *also* isolate the equipment [also] from unwanted lateral and vertical movement caused by the motion of the cameraman using the equipment which comprises *in combination*;

camera equipment components positioned in an expanded balanced arrangement at points remote from each other *for increasing inherent inertial stability and for providing access to the center or the approximate center of gravity and to the center or the approximate center of the moment of inertia of the mass of the components comprising the expanded camera equipment* and about a handle means for guiding the camera equipment, which means is positioned at or approximately at [the] i said center of gravity [and at or approximately at the center of the moment of inertia of the mass of the components comprising the expanded camera equipment];

camera equipment support means [adapted to support] *for supporting* at least part of the weight of the camera equipment [which means is adapted to be pivotally and rotatably connected] *and for substantially freeing the cameraman's hands from the weight of the camera equipment and for pivotable and rotatable connection* to the cameraman and [is connected] to the camera equipment, [said means substantially freeing the cameraman's hands from the weight of the camera equipment] *for*, isolating and free-floating the camera equipment at a distance from the cameraman substantially independently of any of his unwanted lateral and vertical motions and [capable of] *for* being guided to a position in space in a range of positions selected by the cameraman;

pivotable and rotatable means *for* interconnecting *the center or the approximate center of gravity of* the camera equipment with the support means [to permit] *for virtually frictionless* rotatable and pivotal movement of the camera equipment relative to the support means [and which thereby virtually does not transmit deviations in the pan, tilt and roll axes from the cameraman to the camera equipment;] ep *about three perpendicular axes, whereby the camera is virtually isolated from deviations in the pan, tilt and roll axes caused by a cameraman in motion* and view finding means adapted [to indicate] *for indicating* the field of view of the camera to the cameraman without the need for his eye to be in direct contact with the camera.

2. The camera equipment system of claim 1 wherein the camera support means comprises connecting link means at the end closest the cameraman for rotatable movement of the support means relative the cameraman.

3. The camera equipment system of claim 2 wherein the link means comprises means to urge the end of the link farthest from the cameraman in an arc away from the center of the cameraman's chest.

4. The camera equipment system of claim 2 wherein the connecting link means comprises a spring, said spring continuously biasing the connecting link means in an arc away from the center of the cameraman's chest.

5. The camera equipment system of claim 2 wherein the connecting link means comprises a second means for second rotatable movement of the support arms relative the cameraman.

6. The camera equipment system of claim 1 which comprises a brace adapted to be worn by the cameraman.

7. The camera equipment system of claim 6 wherein the connecting link means is connected to the brace.

8. The camera equipment system of claim 6 wherein the support means is adapted to be connected to the brace.

9. The camera equipment system of claim 1 wherein the remotely spaced components comprise at least two components.

10. The camera equipment system of claim 9 wherein the view finding means comprises a video monitor.

11. The camera equipment system of claim 10 wherein the video monitor is remotely positioned from the camera.

12. The camera equipment system of claim 11 wherein the camera image is obtained by a TV camera tube and transmitted to the monitor.

13. The camera equipment system of claim 1 wherein one of the components is configured to be inertially stable about at least two axes.

14. The camera equipment system of claim 1 wherein the remotely spaced components comprise a camera with its film magazine, and another component.

15. The camera equipment system of claim 1 wherein one of the components is the view finding means.

16. The camera equipment system of claim 15 wherein the other component is a camera body.

17. The camera equipment system of claim 16 which comprises another component positioned in a balanced arrangement with the other said two components.

18. The camera equipment system of claim 17 wherein the components are positioned in a triangular arrangement, thereby increasing the system's moment of rotational inertia in three axes.

19. The camera equipment system of claim 15 wherein at least part of the view finding means is positioned below the handle means.

20. The camera equipment system of claim 1 wherein the remotely spaced components comprise at least three components.

21. The camera equipment system of claim 20 wherein the remotely spaced components comprise a camera body, a battery, and a film magazine.

22. The camera equipment system of claim 21 wherein the components are positioned in a vertical or substantially vertical plane, thereby causing a significant moment of inertia in the roll axis.

23. The camera equipment system of claim 20 wherein the film magazine extends rearwardly from the camera.

24. The camera equipment system of claim 23 wherein the film magazine and camera are spaced remote from each other and connected by a magazine extension throat.

25. The camera equipment system of claim 20 wherein all the components are positioned substantially in a vertical plane, thereby causing a significant moment of inertia in the roll axis.

26. The camera equipment system of claim 20 wherein two components are positioned above and two below the handle means.

27. The camera equipment system of claim 1 wherein at least one component is positioned above and one below the handle means, thereby causing a significant moment of inertia in the roll axis.

28. The camera equipment system of claim 1 wherein the components are positioned in a vertical or substantially vertical plane, thereby causing a significant moment of inertia in the roll axis.

29. The camera equipment system of claim 1 wherein the support means comprise means which counteract the force of gravity against the camera equipment, thus counterbalancing the pull downward of the weight of the camera equipment component.

30. The camera equipment system of claim 29 wherein the support means comprise a pair of arm-like supports.

31. The camera equipment system of claim 30 wherein the arm-like supports are interconnected.

32. The camera equipment system of claim 31 wherein the support arms comprise an upper and lower link, which form the legs of a parallelogram arrangement.

33. The camera equipment system of claim 31 wherein the first supporting arm comprises a spring means, said spring means continuously biasing the end of the first arm that is remote from the cameraman upwardly relative to the cameraman, the bias of the spring means being substantially balanced by the weight of the component to cause the component to free float irrespective the movement of the cameraman.

34. The camera equipment system of claim 31 wherein the second supporting arm comprises a spring means, said spring means continuously biasing the end of the second arm which is remote from the cameraman upwardly relative to the cameraman, the bias counteracting the weight of the components of the system.

35. The camera equipment system of claim 31 which comprises a first and second spring means biasing the first and second arms respectively, relative to the cameraman, whereby the weight of the components of the system is counteracted by the bias of the spring means.

36. The camera equipment system of claim 35 wherein the second spring means are of greater strength than the first spring means, thereby imposing increased forces on the first spring means.

37. The camera equipment system of claim 35 wherein the first and second spring means are adapted to pivot the first and second arms about any of their respective pivots in the same direction relative to the cameraman.

38. The camera equipment system of claim 37 wherein at least one of the springs attaches to a support arm in a location offset from both its upper link and its lower link.

39. The camera equipment system of claim 31 wherein the pair of arms comprise a forward and a rearward support arm, said forward and rearward arms being in longitudinal juxtaposed relationship.

40. The camera equipment system of claim 31 wherein the support means are connected at a medial block.

41. The camera equipment system of claim 31 wherein the support means are pivotably connected.

42. The camera equipment system of claim 30 wherein one of the arm-like suports comprise a plurality of substantially frictionless pivots, whereby the arm-like supports may be moved pivotally relative to the cameraman and the pivots do not contribute to counteract the weight of the camera equipment.

43. The camera equipment system of claim 30 wherein the second arm-like support comprises a plurality of substantially frictionless pivots, whereby both arms may be moved pivotally relative to the cameraman and the pivots do not contribute to counteract the weight of the camera equipment.

44. The camera equipment system of claim 1 wherein the support means comprises integral tension means to counterbalance the weight of the camera equipment component.

45. The camera equipment system of claim 1 wherein the support means comprise spring means.

46. The camera equipment system of claim 45 wherein the supports comprise a plurality of substantially frictionless pivots.

47. The camera equipment system of claim 1 wherein the support means comprise resilient means.

48. The camera equipment system of claim 1 wherein the support means comprise a pair of arm-like supports means to counteract the force of gravity against the camera equipment, connecting means connecting the arm-like supports to allow for movement relative to each other.

49. The camera equipment system of claim 1 wherein the support means are capable of horizontal rotatable movement respective of the cameraman.

50. The camera equipment system of claim 1 wherein the weight of the camera equipment which is transmitted to the pivotable and rotatable means is counterbalanced in a vertical direction by the support means without lateral resistance to movement.

51. The camera equipment system of claim 1 wherein the camera equipment comprises means to indicate the angular orientation of the camera in the roll axis.

52. The camera equipment system of claim 51 wherein the camera equipment which comprises means to indicate the angular orientation is visible simultaneously with the view finding means.

53. The camera equipment system according to claim 51 wherein the means to indicate the angular orientation comprises a level indicating device.

54. The camera equipment system of claim 1 wherein the view finding means is a fiber optic bundle adapted to transmit an image from the camera to an eye of the cameraman.

55. The camera equipment system of claim 1 wherein the view finding means comprises means to electronically generate an image on a screen.

56. The camera equipment system of claim 1 wherein the camera is removably affixed to the pivotable and rotatable means.

57. The camera equipment system of claim 1 wherein the pivotable means comprises a gimbal.

58. The camera equipment system of claim 57 in which the pivotal means comprises a gimbal yoke.

59. The camera equipment system of claim 57 in which the rotatable means comprises a bearing mounted within the gimbal.

60. The camera equipment system of claim 1 wherein the pivotable and rotatable means comprise a ball joint.

61. A camera equipment system especially adapted for operation by a cameraman in motion and capable of being hand-guided, the system being of improved stability against angular deviations in pan, tilt and roll, and substantially free-floating in a manner to isolate the equipment also from unwanted lateral and [vertial] *vertical* movement caused by the motion of the cameraman using the equipment which comprises *in interacting combination:* camera equipment components positioned in an expanded balanced arrangement at points remote from each other and balanced about the *accessible* center of gravity and the center of the moment of [inertial] *inertia* of the mass of the components comprising the expanded camera equipment;

camera equipment support means adapted [to support] *for supporting* at least part of the weight of the camera equipment *and for substantially freeing the cameraman's hands from the weight of the camera equipment,* which means is [adapted to be pivotably and rotatably connected] *for pivotable and rotatable connection* to the cameraman and [connected] *for connection* to the camera equipment, [said means substantially freeing the cameraman's hands from weight of the camera equipment,] *for* isolating and free-floating the camera equipment at a distance from the cameraman substantially independently of any of his unwanted lateral and vertical motions and [capable of] *for* being guided to a position in space in a range of positions selected by the cameraman;

the camera equipment [being] adapted [to be] *for being* guided from a position which is located at or approximately at the center of gravity and at or approximately at the center of the moment of [inertial] *inertia* of the mass of the components comprising the expanded camera equipment;

pivotable and rotatable means interconnecting the *approximate center of gravity of the* camera equipment with the support means [to permit] *for virtually freely* rotatable and pivotable movement of the camera equipment *about three perpendicular axes* relative to the support means [and which thereby virtually does not transmit deviations] *thereby virtually isolating the camera equipment* in the *unwanted angular motions of the* pan, tilt and roll axes from the cameraman [to the camera equipment] ; and view finding means [adapted to indicate] *for indicating* the field of view of the camera to the cameraman without the need for his eye to be in direct contact with the camera.

62. The camera equipment system of claim 61 wherein the components are adapted to be rigidly connected.

63. The camera equipment system of claim 61 wherein the support means supports essentially all the weight of the camera equipment.

64. The camera equipment system of claim 61 wherein the support means supports the weight of the camera equipment without the assistance of a counterweight.

65. The camera equipment system of claim 61 wherein the support means comprises means which is expandable and compressible.

66. The camera equipment system of claim 61 wherein the pivotable and rotatable means connecting the camera equipment with the support means is positioned above and in close proximity to the position from which the camera equipment is being guided.

67. The camera equipment system of claim 61 wherein the pivotable and rotatable means is positioned at the center of gravity.

[68. The camera equipment system of claim 61 in which the image display device and lens of the camera equipment are not in parallel alignment.]

69. The camera equipment system of claim 61 which comprises components which are adapted to be positioned in a same vertical plane.

*70. A camera equipment system especially adapted for operation by a cameraman in motion and capable of being hand-guided, the system having a camera and a lens and being of improved stability against angular deviations in pan, tilt and roll, and substantially free-floating in a manner to isolate the equipment also from unwanted lateral and vertical movement caused by the motion of the cameraman using the equipment which comprises in interacting combination:*

*camera equipment components, including a lens, positioned in an expanded balanced arrangement at points remote from each other and balanced about the accessible center of gravity and the center of the moment of inertia of the mass of the components comprising the expanded camera equipment;*

*camera equipment support means adapted for supporting at least part of the weight of the camera equipment and for substantially freeing the cameraman's hands from the weight of the camera equipment, which means is for pivotable and rotatable connection to the cameraman and for connection to the camera equipment, for isolating and free-floating the camera equipment at a distance from the cameraman substantially independently of any of his unwanted lateral and vertical motions and for being guided to a position in space in a range of positions selected by the cameraman;*

*the camera equipment adapted for being guided from a position which is located at or approximately at the center of gravity and at or approximately at the center of the moment of inertia of the mass of the components comprising the expanded camera equipment;*

*pivotable and rotatable means interconnecting the approximate center of gravity of the camera equipment with the support means for virtually freely rotatable*

*and pivotable movement of the camera equipment about three perpendicular axes relative to the support means thereby virtually isolating the camera equipment in the pan, tilt and roll axes from the unwanted angular motions of the cameraman; and*

*an image display device for indicating the field of view of the camera to the cameraman without the need for his eye to be in direct contact with the camera.*

*71. The camera equipment system of claim 70 in which the image display device and the lens of the camera equipment are not in parallel alignment.*

* * * * *